US009985459B2

United States Patent
Lawrenson et al.

(10) Patent No.: US 9,985,459 B2
(45) Date of Patent: May 29, 2018

(54) WIRELESS CHARGING SYSTEM WITH USER DETERMINED REMOVAL

(71) Applicant: TELEFONAKTIEBOLAGET L M ERICSSON (PUBL), Stockholm (SE)

(72) Inventors: Matthew John Lawrenson, Bussigny (CH); Lars Andersson, Solna (SE); Till Burkert, Huddinge (SE); Julian Charles Nolan, Pully (CH); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 187 days.

(21) Appl. No.: 14/787,713

(22) PCT Filed: Sep. 30, 2015

(86) PCT No.: PCT/EP2015/072632
§ 371 (c)(1),
(2) Date: Oct. 28, 2015

(87) PCT Pub. No.: WO2017/054869
PCT Pub. Date: Apr. 6, 2017

(65) Prior Publication Data
US 2017/0163070 A1 Jun. 8, 2017

(51) Int. Cl.
*H02J 7/02* (2016.01)
*H02J 7/00* (2006.01)
*H02J 50/90* (2016.01)

(52) U.S. Cl.
CPC ............ *H02J 7/025* (2013.01); *H02J 7/0044* (2013.01); *H02J 50/90* (2016.02); *H02J 2007/0001* (2013.01); *H02J 2007/0096* (2013.01)

(58) Field of Classification Search
CPC .. H02J 7/0044; H02J 7/025; H02J 2007/0001; H02J 2007/0096; H02J 50/90
(Continued)

(56) References Cited

U.S. PATENT DOCUMENTS

| 2009/0322278 A1* | 12/2009 | Franks | H02J 7/0045 |
| | | | 320/107 |
| 2010/0141217 A1* | 6/2010 | Morris | G06F 1/266 |
| | | | 320/137 |

(Continued)

OTHER PUBLICATIONS

International Search Report and the Written Opinion of the International Searching Authority, issued in corresponding International Application No. PCT/EP2015/072632, dated Jun. 8, 2016, 15 pages.

*Primary Examiner* — William Hernandez
(74) *Attorney, Agent, or Firm* — Rothwell, Figg, Ernst & Manbeck, P.C.

(57) ABSTRACT

A wirelessly chargeable device, such as a smartphone, and a wireless-charging device are provided. The wirelessly chargeable device and the wireless-charging device comprise holding means for generating an attractive force between the wirelessly chargeable device and a charging surface of the wireless-charging device, so as to prevent displacement of the wirelessly chargeable device when placed on the charging surface, and processing means operative to release the wirelessly chargeable device from the charging surface in response to determining that a user intends to remove the wirelessly chargeable device from the charging surface. Advantageously, the wirelessly chargeable device may to be placed on a charging surface which is substantially vertical when in operation, effectively eliminating the need for manually securing the wirelessly chargeable device in order to prevent the wirelessly chargeable device from falling.

44 Claims, 8 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2010/0156345 A1* | 6/2010 | Phelps, III | H02J 7/025 |
| | | | 320/108 |
| 2011/0227527 A1 | 9/2011 | Zhu et al. | |
| 2012/0112553 A1 | 5/2012 | Stoner, Jr. et al. | |
| 2013/0191741 A1 | 7/2013 | Dickinson et al. | |
| 2014/0247010 A1* | 9/2014 | Nishiwaki | H02J 17/00 |
| | | | 320/108 |
| 2015/0054458 A1 | 2/2015 | Yoon et al. | |
| 2015/0102686 A1* | 4/2015 | Washiro | H02J 7/0042 |
| | | | 307/104 |
| 2015/0115877 A1* | 4/2015 | Arai | H02J 7/0042 |
| | | | 320/108 |
| 2015/0162767 A1 | 6/2015 | Oh et al. | |
| 2015/0200561 A1* | 7/2015 | Lee | H02J 7/025 |
| | | | 320/108 |
| 2017/0163072 A1* | 6/2017 | Cheng | H02J 7/025 |
| 2017/0245038 A1* | 8/2017 | Chawan | H04R 1/1016 |

* cited by examiner

WIRELESS CHARGING SYSTEM WITH USER DETERMINED REMOVAL

CROSS REFERENCE TO RELATED APPLICATION(S)

This application is a 35 U.S.C. § 371 National Phase Entry Application from PCT/EP2015/072632, filed Sep. 30, 2015, designating the United States, the disclosure of which is incorporated herein in its entirety by reference.

TECHNICAL FIELD

The invention relates to a wirelessly chargeable device, a wireless-charging device, a method of charging a wirelessly chargeable device, and corresponding computer programs and computer program products.

BACKGROUND

Wireless charging of mobile devices such as smartphones and wearable devices is becoming increasingly prevalent, being driven by standards groups such as QI (http://www.qiwireless.com) and Rezence (http://www.rezence.com), and device manufacturers including the technology in new devices.

Current wireless-charging techniques require the device being charged to be placed within proximity of a wireless-charging device, commonly referred to as a charging mat. For practical reasons, wireless-charging devices are frequently placed on horizontal surfaces such as tables or other furniture. Also known are wireless-charging devices which are integrated into furniture, e.g., a tabletop. For example, restaurants and coffee joints have started offering wireless charging to their patrons with desks or tables having integrated wireless-charging devices.

As horizontal surfaces are often used for a wide variety of tasks, there is a risk for a mobile device which is placed on a wireless-charging device to be inadvertently displaced, e.g., accidently knocked off the table, with the risk of device damage. Therefore, a convenient placement of a wireless-charging device may be on a less used surface, in particular a vertical surface such as a wall, or a vertical surface of a piece of furniture. However, placing a mobile device for wireless charging on a vertical surface has the disadvantage that a specific apparatus, such as a bracket, is needed to hold the device in place. The use of such an additional apparatus to hold the device to the vertical surface to some extent negates the attraction of using wireless charging techniques, as the user still needs to manually secure the mobile device in place.

Also known are magnetic holders for mobile phones, in particular for use in cars. Such holders are provided with permanent magnets and are often shipped with a magnetic patch which can be attached to the rear face of a mobile phone. In order to remove the mobile phone, it is manually pulled from the holder. Since a considerable force needs to be applied to pull the mobile phone from the magnetic holder, there is a risk of damaging the mobile phone. In particular, this is the case for thin devices such as modern smartphones.

SUMMARY

It is an object of the invention to provide an improved alternative to the above techniques and prior art.

More specifically, it is an object of the invention to provide an improved solution for charging a wirelessly chargeable device. In particular, it is an object of the invention to provide an improved solution for holding the wirelessly chargeable device in place when placed on a wireless-charging device.

These and other objects of the invention are achieved by means of different aspects of the invention, as defined by the independent claims. Embodiments of the invention are characterized by the dependent claims.

According to a first aspect of the invention, a wirelessly chargeable device is provided. The wirelessly chargeable device comprises holding means for generating an attractive force between the wirelessly chargeable device and a charging surface of a wireless-charging device, so as to prevent displacement of the wirelessly chargeable device when placed on the charging surface. The wirelessly chargeable device further comprises processing means which are operative to release the wirelessly chargeable device from the charging surface in response to determining that a user intends to remove the wirelessly chargeable device from the charging surface.

According to a second aspect of the invention, a wireless-charging device is provided. The wireless-charging device comprises a charging surface for receiving a wirelessly chargeable device and holding means for generating an attractive force between the wirelessly chargeable device and the charging surface, so as to prevent displacement of the wirelessly chargeable device when placed on the charging surface. The wireless-charging device further comprises processing means which are operative to release the wirelessly chargeable device from the charging surface in response to determining that a user intends to remove the wirelessly chargeable device from the charging surface.

According to a third aspect of the invention, a method of charging a wirelessly chargeable device is provided. The wirelessly chargeable device is held by an attractive force generated between the wirelessly chargeable device and a charging surface of a wireless-charging device, so as to prevent displacement of the wirelessly chargeable device when placed on the charging surface. The method comprises releasing the wirelessly chargeable device from the charging surface in response to determining that a user intends to remove the wirelessly chargeable device from the charging surface.

According to a fourth aspect of the invention, a computer program is provided. The computer program comprises computer-executable instructions for causing a device, such as a wirelessly chargeable device or a wireless-charging device, to perform the method according to an embodiment of the third aspect of the invention, when the computer-executable instructions are executed on a processing unit comprised in the device.

According to a fifth aspect of the invention, a computer program product is provided. The computer program product comprises a computer-readable storage medium which has the computer program according to the fourth aspect of the invention embodied therein.

The invention makes use of an understanding that an improved solution for charging a wirelessly chargeable device may be provided by utilizing holding means, which are provided in either one of the wirelessly chargeable device, the wireless-charging device, or both, for generating an attractive force between the wirelessly chargeable device and a charging surface of the wireless-charging device, so as to prevent displacement of the wirelessly chargeable device when placed on the charging surface.

In the present context, a wirelessly chargeable device may, e.g., be a mobile phone, a mobile terminal, a smartphone, a phablet, a tablet, a personal digital assistant, a wearable device, a watch, or the like, which is capable of wireless charging by a wireless-charging device, commonly referred to as charging mat or charging pad, when placed on a charging surface of the wireless-charging device. The charging surface is an outer surface of the charging device, on which surface a wirelessly chargeable device is placed during the charging process.

Advantageously, by providing an improved solution for holding the wirelessly chargeable device in place when placed on the wireless-charging device, the risk of an inadvertent displacement of the wirelessly chargeable device, such as being knocked-off the table, is reduced. Embodiments of the invention are further advantageous in that they allow the wirelessly chargeable device to be placed on a charging surface which is substantially vertical when in operation, effectively eliminating the need for manually securing the wirelessly chargeable device in order to prevent the wirelessly chargeable device from falling. The wireless-charging device may, e.g., be wall-mounted or integrated into a wall, a shelf, a cupboard, or the like.

Throughout this disclosure, generating an attractive force is to be understood such that the holding means give rise to a physical attractive force between the wirelessly chargeable device and the wireless-charging device, when the wirelessly chargeable device is placed on the charging surface of the wireless-charging device. The attractive force between the two devices results in a friction force preventing the wirelessly chargeable device from being displaced.

In the present context, 'a user' is not limited to a person regularly or predominantly using the wirelessly chargeable device, or an owner of the wirelessly chargeable device, but may in general be any person who attempts to remove the wirelessly chargeable device from the charging surface.

According to an embodiment of the invention, the wirelessly chargeable device further comprises a user-interface for controlling the wirelessly chargeable device. The processing means is operative to determine that the user intends to remove the wirelessly chargeable device by receiving a release instruction from the user via the user-interface. The user-interface may, e.g., comprise one or more buttons or keys or a touchscreen displaying one or more virtual buttons. Alternatively, the user-interface may also be a natural-language user-interface like Apple's Siri. In response to detecting that a button or a virtual button is pressed, or a spoken instruction is received, the wirelessly chargeable device is released.

According to an embodiment of the invention, the wirelessly chargeable device further comprises a camera which is facing in a direction opposite to the charging surface when the wirelessly chargeable device is placed on the charging surface. In particular, this may be a front-facing camera if the wirelessly chargeable device is placed with its rear face on the charging surface of the wireless-charging device. The processing means is operative to determine that the user intends to remove the wirelessly chargeable device by retrieving one or more images captured by the camera, and detecting a release gesture performed by a body part of the user. This may, e.g., be a predetermined gesture or a gesture trained by the user, e.g., a waving hand, a hand with a certain number of elongated fingers, a face mimic, or the like. The release gesture is detected by image processing the one or more captured images.

According to an embodiment of the invention, the wirelessly chargeable device and/or the wireless-charging device further comprise(s) a pressure sensor for measuring a pressure applied to the wirelessly chargeable device or the charging surface, respectively. The processing means is operative to determine that the user intends to remove the wirelessly chargeable device by detecting that the wirelessly chargeable device is pushed against the charging surface. This may be achieved by detecting that the measured pressure exceeds a threshold value. That is, the user can release the wirelessly chargeable device by pushing it against the charging surface.

According to an embodiment of the invention, the wirelessly chargeable device further comprises one or more touch sensors for detecting a hand of the user touching the wirelessly chargeable device. The touch sensors may, e.g., be pressure sensors or capacitive sensors which are provided on the casing of the wirelessly chargeable device where the user is expected to grip when removing the device from the charging surface. The processing means is operative to determine that the user intends to remove the wirelessly chargeable device by detecting that the wirelessly chargeable device is gripped by a hand of the user. Detecting a grip by a hand may be used as the sole indicator that the user wants to remove the device, or in combination with other indicators as described herein. Optionally, the wirelessly chargeable device is only released if it is determined that the user has sufficient grip so as to not drop the device on release, i.e., if the pressure applied by the fingers of the user's hand exceeds a predetermined threshold. This is advantageous in that it is safeguarded that the user has firmly gripped the device before it is released.

According to an embodiment of the invention, the processing means is operative to release the wirelessly chargeable device by controlling the holding means to reduce the attractive force. In particular, the attractive force may be controlled to vanish or substantially vanish, e.g., by switching off the holding means.

According to an embodiment of the invention, the processing means is further operative to control the holding means to increase the attractive force in response to detecting that the wirelessly chargeable device is being placed on the charging surface. In particular, this may be achieved by switching on the holding means. The wirelessly chargeable device and/or the wireless-charging device may detect that the wirelessly chargeable device is being placed on the charging surface by means of pressure sensors or capacitive sensors, or by measuring the strength of a radio signal emitted by one or both of the devices.

According to an embodiment of the invention, the wirelessly chargeable device and/or the wireless-charging device may further comprise one or more protrusible members. The protrusible members may be provided on a face of the wirelessly chargeable device facing the charging surface when placed on the charging surface, or the charging surface, respectively. Furthermore, the processing means is operative to release the wirelessly chargeable device by controlling the one or more protrusible members to protrude. The protrusible members may, e.g., be rods or inflatable cushions which are controlled to protrude so as to introduce a gap between an outer surface of the wirelessly chargeable device, such as the device's rear face, and the charging surface, effectively reducing the attractive force and/or a resulting friction force between the outer surface of the wirelessly chargeable device and the charging surface.

According to an embodiment of the invention, the wirelessly chargeable device may further be configured to change its shape, and the processing means is operative to release the wirelessly chargeable device by controlling the shape of the wirelessly chargeable device so as to reduce a contact area between the wirelessly chargeable device and the charging surface. This may, e.g., be achieved by changing at least parts of the device to assume a curved shape. Optionally, the wirelessly chargeable device may change its shape so as to facilitate gripping the device, without releasing the wirelessly chargeable device from the charging surface.

According to an embodiment of the invention, the wirelessly chargeable device may further comprise a communication unit for effecting wireless communications with the wireless-charging device, and the processing means may be operative to release the wirelessly chargeable device by transmitting a release request to the wireless-charging device. The release request is transmitted via the communication unit. Correspondingly, the wireless-charging device may further comprise a communication unit for effecting wireless communications with the wirelessly chargeable device, and the processing means may be operative to determine that the user intends to remove the wirelessly chargeable device by receiving a release request from the wirelessly chargeable device. The release request is received via the communication unit. In other words, the wirelessly chargeable device detects that the user intends to remove the wirelessly chargeable device and signals the wireless-charging device to release the wirelessly chargeable device.

According to an embodiment of the invention, the processing means may be operative to authenticate the user in response to detecting that the user intends to remove the wirelessly chargeable device, and release the wirelessly chargeable device only if the user is successfully authenticated. The user may, e.g., be authenticated by face recognition, voice recognition, detecting proximity of a wearable device which is associated with the user, such as the user's smart watch, or fingerprint-based authentication, e.g., if a button is pressed to release the device.

According to an embodiment of the invention, the holding means may comprise a magnetic member, such as a permanent magnet, an electromagnet, or a paramagnetic material. The magnetic member may be provided in the wirelessly chargeable device and/or the wireless-charging device. For instance, the magnetic member may comprise a wireless-charging coil comprised in the wirelessly chargeable device and/or a wireless-charging coil comprised in the wireless-charging device. One or both of the wireless-charging coils may be used as electromagnet by driving a constant current through the coil. As an alternative, at least part of the rear face of the wirelessly chargeable device may be magnetic, in particular paramagnetic or ferromagnetic, wherein the attractive force is generated in conjunction with a permanent magnet or an electromagnet comprised in the charging surface.

According to an embodiment of the invention, the holding means may comprise an adhesive surface which is provided on a face of the wirelessly chargeable device facing the charging surface when placed on the charging surface, and/or on the charging surface of the wireless charging device, respectively. Each of the adhesive surfaces provides an adhesive force which may optionally be controllable.

Even though advantages of the invention have in some cases been described with reference to embodiments of the first and second aspects of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1A:
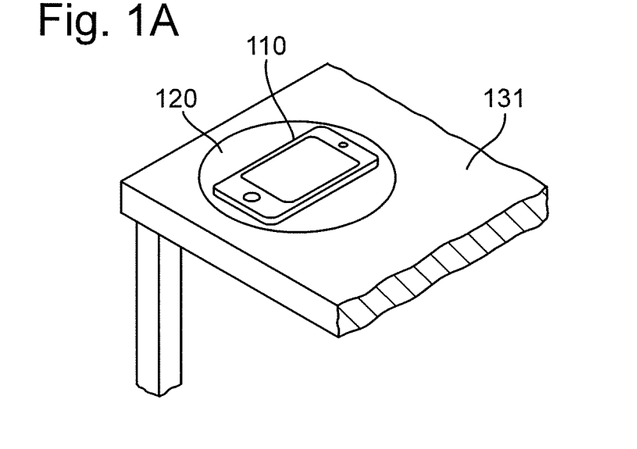
FIGS. 1A-1C illustrate charging of a wirelessly chargeable device, in accordance with embodiments of the invention.
Figure 1B:
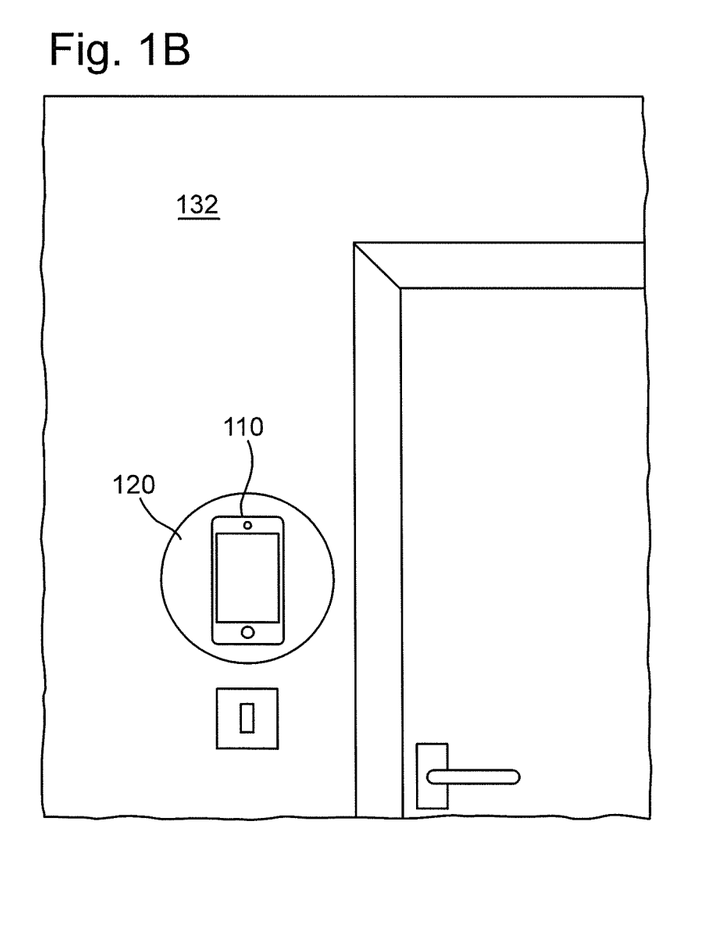
Figure 1C:
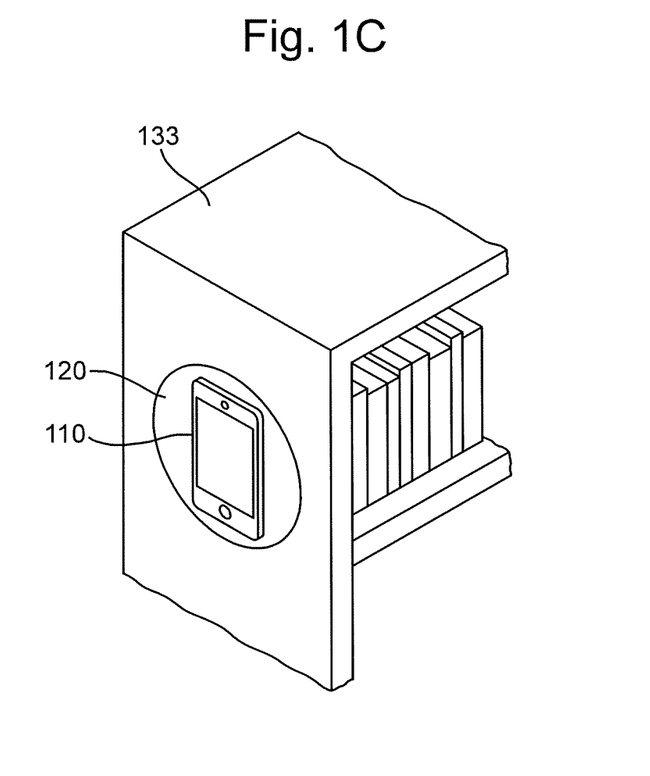

In FIGS. 1A to 1C, charging of a wirelessly chargeable device 110 which is placed on a charging surface 120 of a wireless-charging device is illustrated, in accordance with embodiments of the invention. Throughout this disclosure, the terms 'charging surface' and 'wireless-charging device' are occasionally used interchangeably. In particular, placing a wirelessly chargeable device on a charging surface is to be understood as placing the wirelessly chargeable device on an outer surface (the 'charging surface') of the wireless-charging device, which outer surface is arranged for receiving a wirelessly chargeable device for charging. Note that the wirelessly chargeable device is not necessarily in direct contact with the charging surface during charging. For instance, the wireless-charging device may be integrated into a piece of furniture, e.g., a tabletop, in which case a part of the tabletop, such as a layer of wood or plastic, may cover the charging surface.

To elucidate the invention, FIG. 1A shows wirelessly chargeable device 110 being placed on a horizontal charging surface 120 which is integrated into a tabletop 131. As a further example, FIG. 1B shows charging surface 120 as being integrated into a wall 132, e.g., adjacent to a light-switch. As yet a further example, FIG. 1C illustrates charging surface 120 as being integrated into the side of a bookshelf 133. For the examples depicted in FIGS. 1B and 1C, charging surface 120 is substantially vertical when in operation. Accordingly, wirelessly chargeable device 110 needs to be secured to prevent it from falling when placed on vertical charging surface 120. Advantageously, wirelessly chargeable device 110 may also be secured if placed on a horizontal charging surface 120, as is illustrated in FIG. 1A, to prevent an inadvertent displacement of wirelessly chargeable device 110. Thereby, it may be prevented that wirelessly chargeable device 110 is accidently knocked-off the table.

Figure 2A:
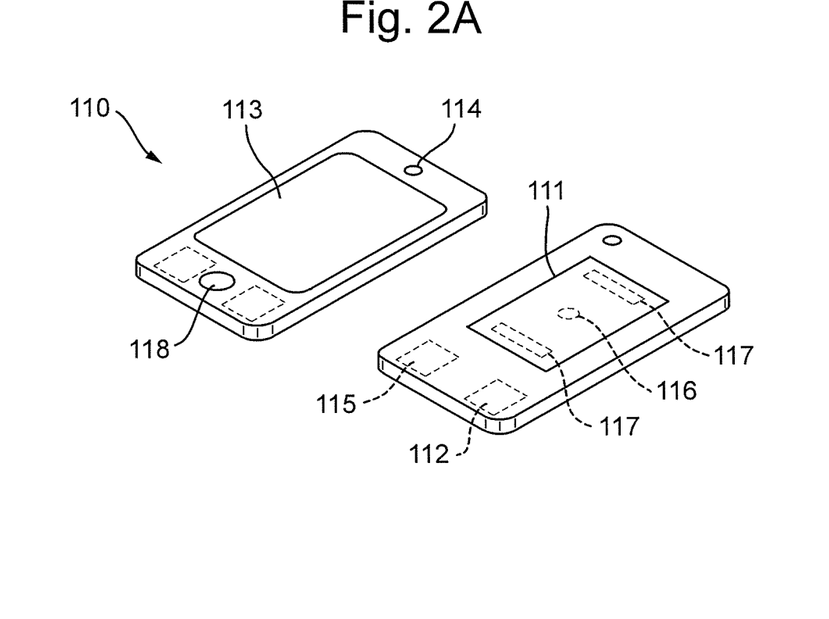
FIGS. 2A and B show embodiments of the wirelessly chargeable device.

In the following, embodiments of the wirelessly chargeable device are described with reference to FIGS. 2A and 2B. In FIG. 2A, wirelessly chargeable device 110 is illustrated as a smartphone, in front-view (left) and rear-view (right). Smartphone 110 is shown as comprising a display 113, e.g., a touchscreen, a front-facing camera 114, a button 118 (such as the 'Home' button of the iPhone), and holding means 111 which is provided on the rear face of smartphone 110. Holding means 111 is configured for generating an attractive force between smartphone 110 and a charging surface of a wireless-charging device, such as charging surface 120, so as to prevent displacement of smartphone 110 when placed on the charging surface.

Throughout this disclosure, 'generating an attractive force' is to be understood such that holding means 111 gives rise to an attractive force between smartphone 110, in particular an outer surface of smartphone 110 such as its rear face, or any other embodiment of the wirelessly chargeable device, and a charging surface on which it is placed. The attractive force between the two devices results in a friction force preventing wirelessly chargeable device 110 from being displaced, either horizontally, if placed on a horizontal charging surface 120 illustrated in FIG. 1A, or vertically, if placed on a vertical charging surface 120 illustrated in FIGS. 1B and 1C, thereby preventing it from falling. Smartphone 110 further comprises processing means 112 which are operative to release smartphone 110 from the charging surface in response to determining that a user intends to remove smartphone 110 from the charging surface.

Figure 2B:
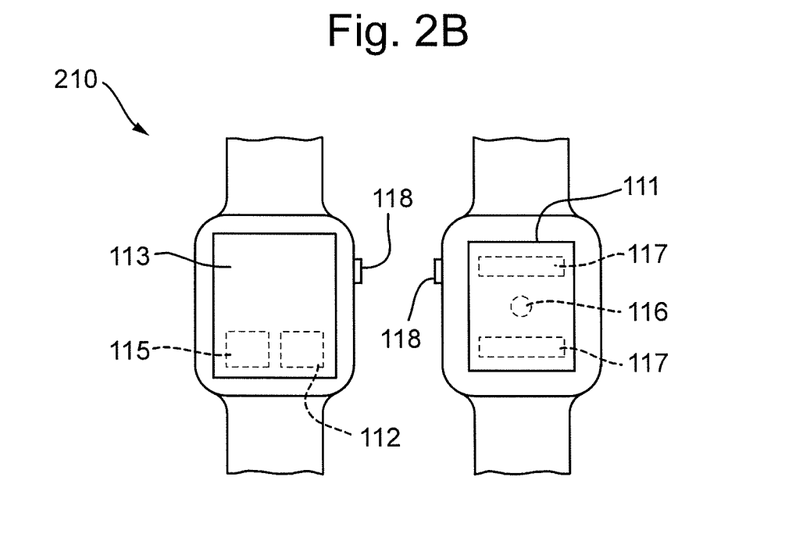

In FIG. 2B, an alternative embodiment of the wirelessly chargeable device is illustrated as a smartwatch 210, in front-view (left) and rear-view (right). Similar to smartphone 110, smartwatch 210 comprises a display 113, e.g., a touchscreen, a button 118 (such as a digital crown), and holding means 111 which is provided on the rear face of smartwatch 210.

Even though embodiments of the wirelessly chargeable device are throughout this disclosure illustrated as smartphone 110 or smartwatch 210, the wirelessly chargeable device may alternatively be embodied as a mobile phone, a mobile terminal, a tablet, a personal digital assistant, a wearable device, or any other type of wirelessly chargeable device.

Embodiments of the wirelessly chargeable device may further comprise additional components, in particular an induction coil for receiving an alternating electromagnetic field created by a corresponding induction coil comprised in the charging surface of the wireless-charging device. The alternating electromagnetic field is used for transferring energy to the wirelessly chargeable device when placed on the charging surface, as is known in the art. The induction coil is advantageously arranged such that is close to the charging surface when the wirelessly chargeable device is placed on the charging surface. The two induction coils in proximity combine to form an electrical transformer.

Figure 3:
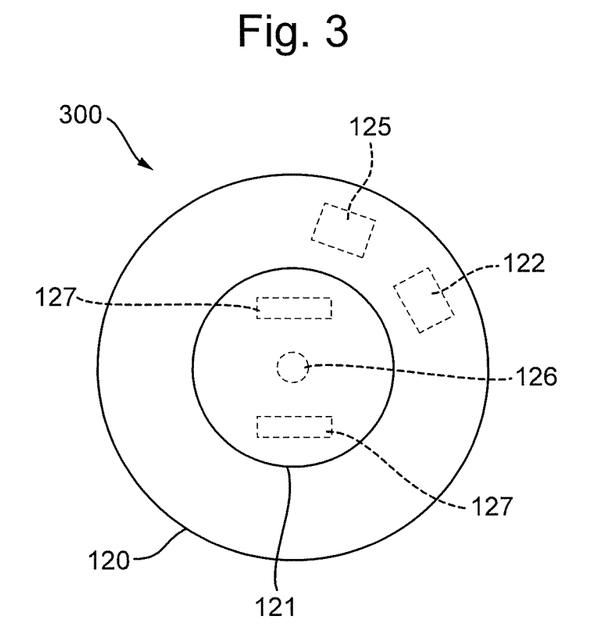
FIG. 3 shows the wireless-charging device, in accordance with an embodiment of the invention.

With reference to FIG. 3, embodiments of the wireless-charging device are now described. Wireless-charging device 300 comprises a charging surface 120 for receiving a wirelessly chargeable device, such as smartphone 110, smartwatch 210, or any other embodiment of the wirelessly chargeable device, and holding means 121 for generating an attractive force between the wirelessly chargeable device and charging surface 120, so as to prevent displacement of the wirelessly chargeable device when placed on charging surface 120. Holding means 121 is preferably comprised in charging surface 120. Wireless-charging device 300 further comprises processing means 122 which is operative to release the wirelessly chargeable device from charging surface 120 in response to determining that a user intends to remove the wirelessly chargeable device from charging surface 120. Wireless-charging device 300 may further comprise other components, in particular an induction coil and a suitable power supply to create an alternating electromagnetic field for transferring energy to the wirelessly chargeable device, as is known in the art. The induction coil is advantageously arranged close to charging surface 120 to be in proximity to a corresponding induction coil comprised in the wirelessly chargeable device. It will also be appreciated that charging surface 120, comprising holding means 111, may be provided separately from wireless-charging device 300 to facilitate integration into a piece of furniture, such as a tabletop 131 or a bookshelf 133, or a wall 132, as is illustrated in FIGS. 1A to 1C.

In the following, embodiments of the invention are described in further detail, with reference to FIGS. 4A to 4C which illustrate removing wirelessly chargeable device 110/210 from charging surface 120.

An embodiment of wirelessly chargeable device 110/210 may comprise a user-interface for controlling wirelessly chargeable device 110/210, e.g., button 118 or touchscreen 113, as is known in the art. Touchscreen 113 may, e.g., display a virtual button 412 ('Release') as is illustrated in FIG. 4A. For instance, virtual button 412 may be displayed by an app which is provided with the wireless-charging device used for charging wirelessly chargeable device 110/210. Processing means 112 is operative to determine that the user intends to remove wirelessly chargeable device 110/210 by receiving a release instruction from the user via the user-interface. To this end, wirelessly chargeable device 110/210 is released in response to button 118 or virtual button 412 being pressed by a finger 411 of a hand 410 of the user. Optionally, button 118 or virtual button 412 may need to be pressed several times, e.g., twice within a short time interval (aka double-clicking), to trigger release of wirelessly chargeable device 110/210. As an alternative, the user-interface comprised in wirelessly chargeable device 110/210 may also be a natural-language user-interface, like Apple's Sid. In this case, as is illustrated in FIG. 4B, the release instruction is a spoken instruction 421 (Release') received from user 420.

An embodiment of wirelessly chargeable device 110 may further comprise a camera 114, in particular a camera which is provided on the front face of the device 110, such as a front-facing camera which is frequently built-into modern smartphones. When wirelessly chargeable device 110 is placed on the charging surface, camera 114 faces in a direction opposite to the charging surface. Accordingly, a user attempting to remove wirelessly chargeable device 110 from the charging surface, or at least a body part of the user, is within the field-of-view of camera 114. Processing means 112 is operative to retrieve one or more images captured by camera 114 and to detect a release gesture performed by a body part of the user. This may, e.g., be a predetermined gesture or a gesture trained by the user, such as a waving hand, a hand with a certain number of elongated fingers, or a face mimic. The release gesture is detected by image-processing the one or more captured images, as is known in the art. In response to detecting the release gesture, it is determined that the user intends to remove wirelessly chargeable device 110, in response to which wirelessly chargeable device 110 is released.

An embodiment of wirelessly chargeable device 110/210 or wireless-charging device 300 may further comprise a pressure sensor 116/126 for measuring a pressure applied to wirelessly chargeable device 110 when placed on charging surface 120. Pressure sensor 116/126 may, e.g., comprise a capacitive pressure sensor or any other type of pressure sensor known in the art. Processing means 112/122 is operative to determine that the user intends to remove wirelessly chargeable device 110/210 by detecting that wirelessly chargeable device 110/210 is pushed against charging surface 120. To this end, the user may release wirelessly chargeable device 110/210 by pressing it against charging surface 120. This may be achieved by measuring the pressure which is exerted by wirelessly chargeable device 110/210 on the charging surface and releasing wirelessly chargeable device 110/210 if the measured pressure exceeds a predetermined threshold value.

Figure 4A:
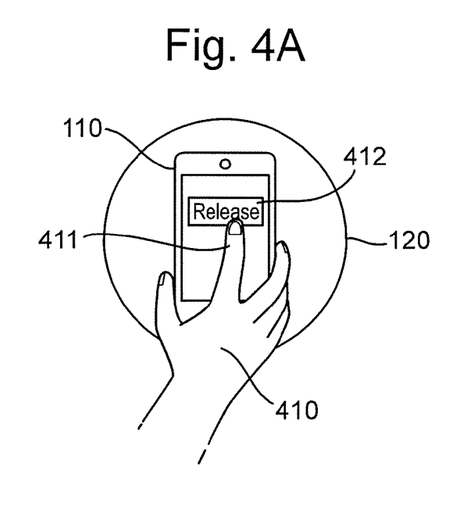
FIGS. 4A-4C illustrate removing the wirelessly chargeable device from the charging surface of the wireless-charging device, in accordance with embodiments of the invention.
Figure 4B:
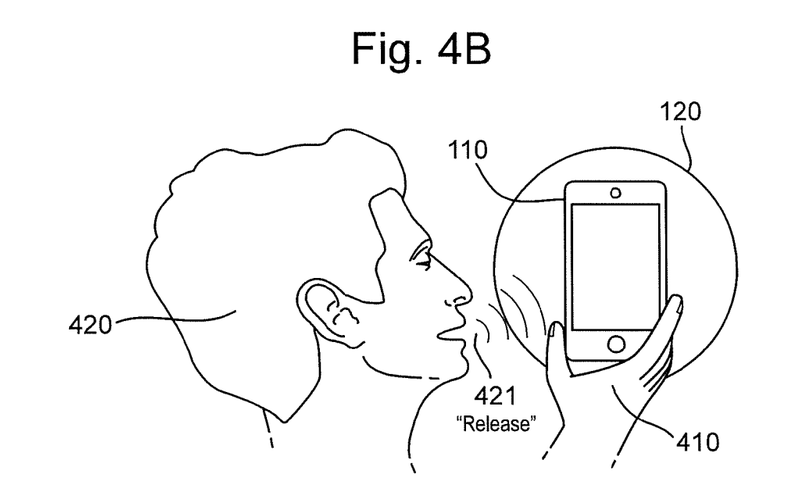
Figure 4C:
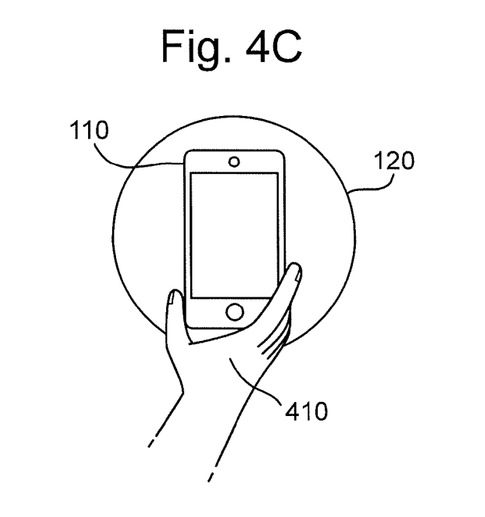

An embodiment of wirelessly chargeable device 110 may further comprise touch sensors for detecting a hand 410 of the user touching wirelessly chargeable device 110, as is illustrated in FIG. 4C. The touch sensors may, e.g., comprise pressure sensors or capacitive sensors which are provided on the casing of wirelessly chargeable device 110, preferably at a location or locations where the user is expected to grip wirelessly chargeable device 110 with hand 410 when attempting to remove it from charging surface 120. Processing means 112 is operative to determine that the user intends to remove wirelessly chargeable device 110 by detecting that wirelessly chargeable device 110 is gripped by hand 410 of the user. Optionally, wirelessly chargeable device 110 is only released if it is determined that the user has sufficient grip so as to not drop wirelessly chargeable device 110 on release, i.e., if the pressure applied by the fingers of the user's hand 410 exceeds a predetermined threshold value.

It will be appreciated that detecting a grip by hand 410 may be used as the sole indicator that the user wants to remove wirelessly chargeable device 110, or in combination with other indicators described herein, such as receiving a release instruction or detecting a release gesture. This is advantageous in that it is safeguarded that the user has firmly gripped the wirelessly chargeable device before it is released.

According to an embodiment of the invention, holding means 111 and/or holding means 121 may comprise a magnetic member, such as a permanent magnet, an electromagnet, a ferromagnetic material, or a paramagnetic material. Embodiments of the invention comprising magnetic members rely on a magnetic attractive force between wirelessly chargeable device 110/210 and charging surface 120. This may be achieved by utilizing one of the induction coils comprised in wirelessly chargeable device 110/210 and wireless-charging device 300 in combination with a permanent magnet or a paramagnetic material comprised in the other device. An induction coil comprised in wirelessly chargeable device 110/210 or wireless-charging device 300 may be used as electromagnet by driving a constant current through the induction coil to generate a magnetic field. Alternatively, both induction coils may be used in combination, by driving a respective current through each of the coils so as to generate magnetic fields which interact to result in an attractive force between the induction coils and thereby wirelessly chargeable device 110/210 and wireless-charging device 300. The magnetic member may either be provided inside a casing of wirelessly chargeable device 110/210 and/or wireless charging device 300, or on an outer surface. As an alternative, holding means 111 and 121 may comprise a permanent magnet and a paramagnetic member, respectively, or each of holding means 111 and 121 may comprise a permanent magnet. In this case, the attractive force cannot be reduced by controlling the means which is generating the attractive force, as is the case if an induction coil is used for generating the attractive force. Rather, the attractive force may be reduced by means of protrusible members which wirelessly chargeable device 110/210 or wireless-charging device 300 are provided with, or by changing the shape of wirelessly chargeable device 110/210, as is described further below.

Figure 6:
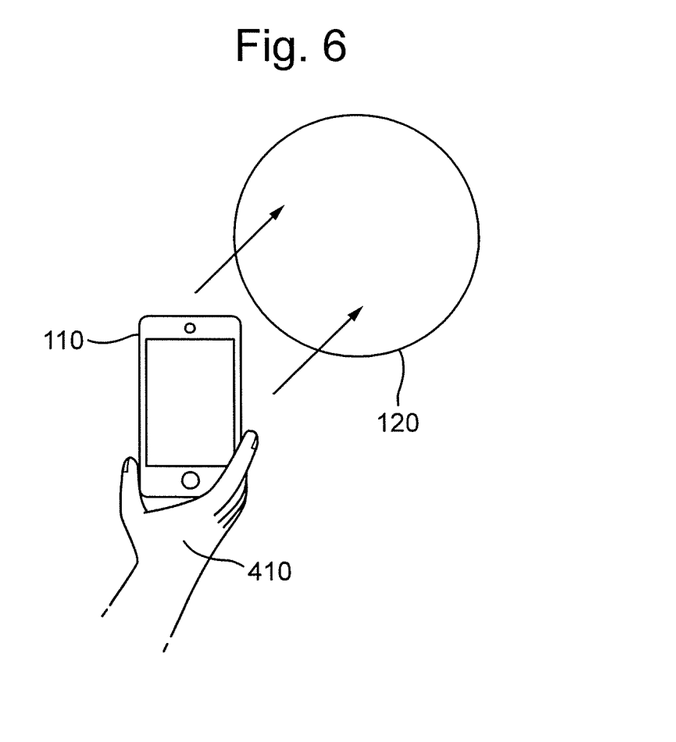
FIG. 6 illustrates placing the wirelessly chargeable device on the charging surface of the wireless-charging device, in accordance with an embodiment of the invention.

According to an embodiment of the invention, processing means 112 or 122 may be operative to release wirelessly chargeable device 110/210 by controlling holding means 111 or 121, respectively, to reduce the attractive force. In particular, the attractive force may be controlled to vanish or substantially vanish by switching holding means 111 or 121 off. If holding means 111 and/or 121 comprise(s) an induction coil, the attractive force may be reduced by decreasing the current through the induction coil. Optionally, processing means 112 or 122 may further be operative to control holding means 111 or 121, respectively, to increase the attractive force in response to detecting that wirelessly chargeable device 110/210 is being placed on charging surface 120. This is exemplified in FIG. 6, which illustrates placing wirelessly chargeable device 110 on charging surface 120. Holding means 111 or 121 may be controlled to increase the attractive force by switching holding means 111 or 121 on. If holding means 111 and/or 121 comprise(s) an induction coil, the attractive force may be increased by increasing the current through the induction coil. Wirelessly chargeable device 110/210 and/or wireless-charging device 300 may be operative to detect that wirelessly chargeable device 110/210 is being placed on charging surface 120 by means of pressure sensors 116 or 126, respectively, or by detecting an increase in signal strength of a radio signal transmitted by one of wirelessly chargeable device 110/210 and wireless-charging device 300 and received by the other.

According to an embodiment of the invention, holding means 111 and/or holding means 121 may comprise an adhesive surface which is provided on an outer face of wirelessly chargeable device 110/210 facing charging surface 120 when wirelessly chargeable device 110/210 is placed on charging surface 120, or on charging surface 120, respectively. The adhesive surface or surfaces may be based on mechanical, chemical, dispersive, electrostatic, or diffusive adhesion, or a combination thereof, as is known in the art. Preferably, the adhesive surface or surfaces is/are controllable by processing means 112/122 to reduce the attractive force in response to determining that a user intends to remove wirelessly chargeable device 110/210 from charging surface 120, thereby releasing wirelessly chargeable device 110/210, and increase the attractive force if wirelessly chargeable device 110/210 is being placed on charging surface 120. Adhesive surfaces with controllable adhesion are known in the art. For instance, adhesion may be created through use of microscopic pillars, similar to those found on a gecko's foot, which bond with a surface due to Van der Waals forces in a controllable manner [V. Bandmann, R. Hensel, K. Moh, E. Arzt, "Das Gecko Prinzip: Bioinspirierte Haftsysteme für die industrielle Anwendung", GIT Labor-Fachzeitschrift 59, pages 55-57, 2015; H. K. Minsky and K. T. Turner, "Achieving enhanced and tunable adhesion via composite posts", Applied Physics Letters, vol. 106, 201604, 2015; E. W. Hawkes, D. L. Christensen, A. K. Han, H. Jiang, and M. R. Cutkosky, "Grasping without squeezing: Shear adhesion gripper with fibrillar thin film", 2015 IEEE International Conference on Robotics and Automation (ICRA), Seattle, Wash., May 26-30, 2015].

According to an embodiment of the invention, wirelessly chargeable device 110/210 and/or wireless-charging device 300 may further comprise one or more protrusible members 117/127 which are provided on a face of wirelessly chargeable device 110/210 facing charging surface 120 when wirelessly chargeable device 110/210 is placed on charging surface 120, or on charging surface 120, respectively. Protrusible members 117/127 may, e.g., be rods which can be controlled to protrude out of the surface of the device, or inflatable cushions which are integrated into the surface of the device. Processing means 112/122 is operative to release wirelessly chargeable device 110/210 by controlling protrusible members 117/127 to protrude, thereby reducing the attractive force between wirelessly chargeable device 110/210 and charging surface 120. This is particularly advantageous in cases where holding means 111/121 is not controllable to reduce the attractive force generated by it. Rather, the attractive force between the devices is reduced by increasing a distance between the devices and/or reducing a contact area between the two devices. For instance, if the attractive force is caused by a permanent magnet in one of holding means 111 and 121 and a paramagnetic member in the other holding means, the attractive force can effectively be reduced by increasing the distance between the permanent magnet and the paramagnetic member. As a further example, if the attractive force is caused by an adhesive member comprised in at least one of holding means 111 and 121, e.g., on an outer surface of wirelessly chargeable device 110/210 which is facing charging surface 120 during operation, or on charging surface 120, the attractive force can be effectively reduced by reducing the contact area between the outer surface of wirelessly chargeable device 110/210 and charging surface 120. Increasing the distance and reducing the contact area may be achieved by protruding protrusible members 117/127 from one or both of a surface of wirelessly chargeable device 110/210 or charging surface 120, thereby pushing wirelessly chargeable device 110/210 away from charging surface 120.

Figure 5:
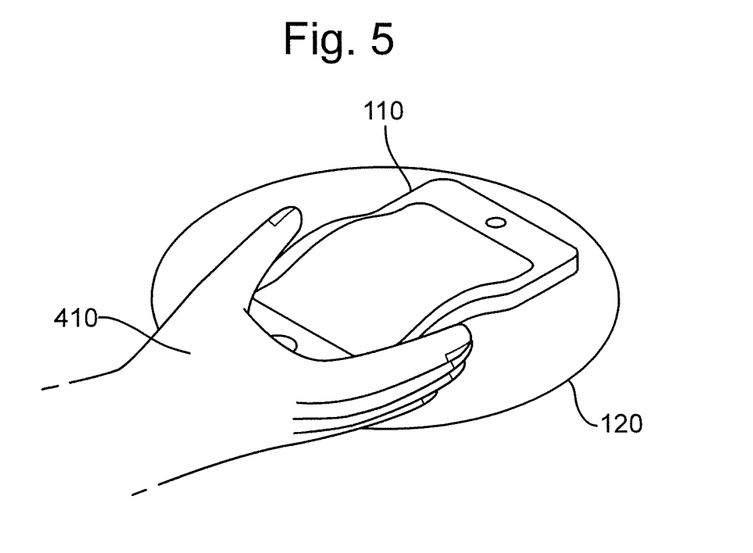
FIG. 5 shows another embodiment of the wirelessly chargeable device.

According to an embodiment of the invention, wirelessly chargeable device 110/210 may further be configured to change its shape, i.e., the shape of its casing. This may, e.g., be achieved if wirelessly chargeable device 110/210 comprises flexible components, i.e., a flexible casing, a flexible circuit board, a flexible touchscreen, and so forth. Such flexible devices may, e.g., be based on Electroactive Polymers (EAPs), which allow changing the device's shape by applying electric fields. As an alternative, actuators may be utilized for changing the shape of wirelessly chargeable device 110/210. Processing means 112 is operative to release wirelessly chargeable device 110/210 by controlling the shape of wirelessly chargeable device 110/210 so as to reduce a contact area between wirelessly chargeable device 110/210 and charging surface 120, as is illustrated in FIG. 5. Thereby, the attractive force between an adhesive member provided on one of an outer surface of wirelessly chargeable device 110/210 which is facing charging surface 120 during operation, or on charging surface 120, and a surface with which the adhesive member is in contact, is reduced. Optionally, wirelessly chargeable device 110/210 may change its shape so as to facilitate gripping the device with the user's hand 410, without releasing the device. To this end, if it is determined that the user intends to remove wirelessly chargeable device 110/210 from charging surface 120, wirelessly chargeable device 110/210 changes its shape so as to facilitate gripping, e.g., by bending a small portion of wirelessly chargeable device 110/210 such that the device is still held in its position, as is illustrated in FIG. 5 (note that the remaining contact area needs to be sufficiently large to support the weight of wirelessly chargeable device 110/210). Then, in response to detecting that hand 410 has gripped wirelessly chargeable device 110/210, the shape is changed to a larger extent, e.g., by bending a larger portion of wirelessly chargeable device 110/210, thereby decreasing the contact area even further and eventually releasing wirelessly chargeable device 110/210.

According to an embodiment of the invention, wirelessly chargeable device 110/210 and wireless-charging device 300 may further comprise communication units 115 and 125, respectively, for effecting wireless communications with each other. Processing means 112 is operative to release wirelessly chargeable 110/210 device by transmitting, via communication unit 115, a release request to wireless-charging device 300. Correspondingly, processing means 122 is operative to determine that the user intends to remove wirelessly chargeable device 110/210 by receiving, via communication unit 125, a release request from wirelessly chargeable device 110/210. To this end, wirelessly chargeable device 110/210 detects that the user intends to remove the device and signals wireless-charging device 310 to release wirelessly chargeable device 110/210.

According to an embodiment of the invention, processing means 112 or 122 may further be operative to authenticate the user in response to detecting that the user intends to remove wirelessly chargeable device 110/210, wherein wirelessly chargeable device 110/210 is only released if the user is successfully authenticated. The user may, e.g., be authenticated by wirelessly chargeable device 110/210 based on face recognition, using front-facing camera 114, or based on voice recognition, in connection with a natural-language user-interface which may additionally be used for receiving a release instruction from the user, as is illustrated in FIG. 4B. Alternatively, the user may be authenticated by wirelessly chargeable device 110/210 or wireless-charging device 300 based on detecting proximity of a wearable device carried by the user, such as a smartwatch which is known to be associated with the user. As yet a further alternative, fingerprint-based authentication may be used, e.g., if button 118 is pressed to release wirelessly chargeable device 110.

In the following, embodiments of processing means 112 and 122 are described with reference to FIGS. 7 to 10.

Figure 7:
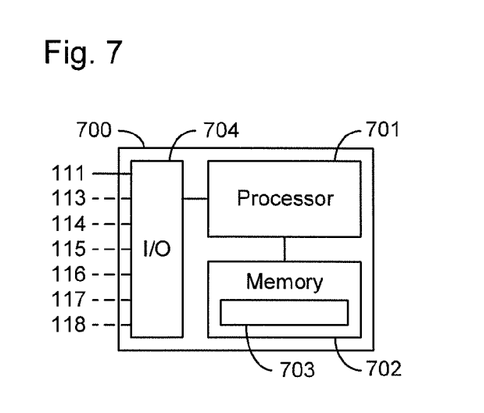
FIG. 7 shows the processing means comprised in the wirelessly chargeable device, in accordance with an embodiment of the invention.

FIG. 7 shows an embodiment 700 of processing means 112 comprised in wirelessly chargeable device 110/210. Processing means 700 comprises a processing unit 701, such as a general purpose processor, and a computer-readable storage medium 702, such as a Random Access Memory (RAM), a Flash memory, or the like. In addition, processing means 700 comprises one or more interfaces 704 ('I/O' in FIG. 7) for controlling and/or receiving information from holding means 111, and optionally touchscreen 113, button 118, camera 114, communication unit 115, pressure sensor 116, and/or protrusible members 117. Memory 702 contains computer-executable instructions 703, i.e., a computer program, for causing a wirelessly chargeable device, such as a mobile phone, a mobile terminal, a smartphone, a tablet, a personal digital assistant, a wearable device, a watch, or the like, to perform in accordance with an embodiment of the invention as described herein, when computer-executable instructions 703 are executed on processing unit 701.

Figure 8:
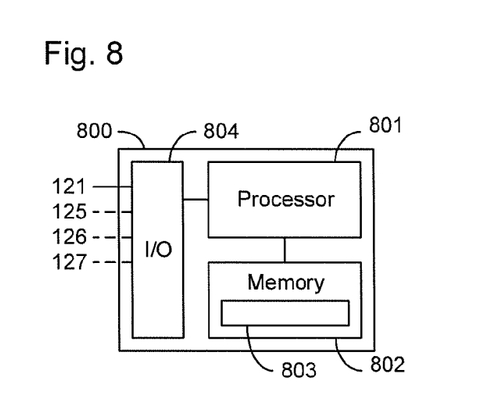
FIG. 8 shows the processing means comprised in the wireless-charging device, in accordance with an embodiment of the invention.

FIG. 8 shows an embodiment 800 of processing means 122 comprised in wireless-charging device 300. Processing means 800 comprises a processing unit 801, such as a general purpose processor, and a computer-readable storage medium 702, such as a RAM, a Flash memory, or the like. In addition, processing means 800 comprises one or more interfaces 804 ('I/O' in FIG. 8) for controlling and/or receiving information from holding means 121, and optionally communication unit 125, pressure sensor 126, and/or protrusible members 127. Memory 802 contains computer-executable instructions 803, i.e., a computer program, for causing a wirelessly chargeable device, such as a mobile phone, a mobile terminal, a smartphone, a tablet, a personal digital assistant, a wearable device, a watch, or the like, to perform in accordance with an embodiment of the invention as described herein, when computer-executable instructions 803 are executed on processing unit 801.

Figure 9:
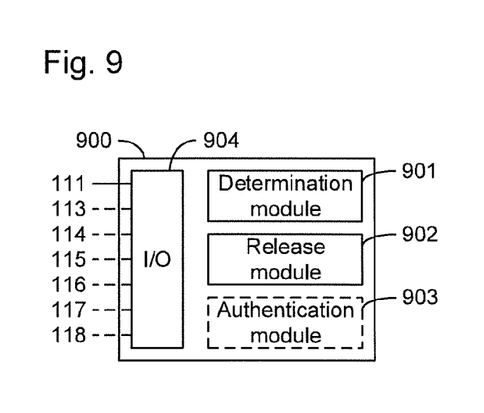
FIG. 9 shows the processing means comprised in the wirelessly chargeable device, in accordance with another embodiment of the invention.

FIG. 9 shows an alternative embodiment 900 of processing means 112 comprised in wirelessly chargeable device 110/210. Processing means 900 comprises a determination module 901 for determining that a user intends to remove wirelessly chargeable device 110/210 from the charging surface, and a release module 902 for releasing wirelessly chargeable device from the charging surface in response to the determination. In addition, processing means 900 comprises one or more interfaces 904 ('I/O' in FIG. 9) for controlling and/or receiving information from holding means 111, and optionally touchscreen 113, button 118, camera 114, communication unit 115, pressure sensor 116, and/or protrusible members 117. Optionally, processing means 900 may further comprise authentication module 903 for authenticating the user in response to detecting, by determination module 901, that the user intends to remove wirelessly chargeable device 110/210, wherein wirelessly chargeable device 110/210 is only released by release module 902 if the user is successfully authenticated. Determination module 901, release module 903, authentication module 903, and additional modules which processing means 900 may comprise, are configured to perform in accordance with an embodiment of the invention as described herein.

Figure 10:
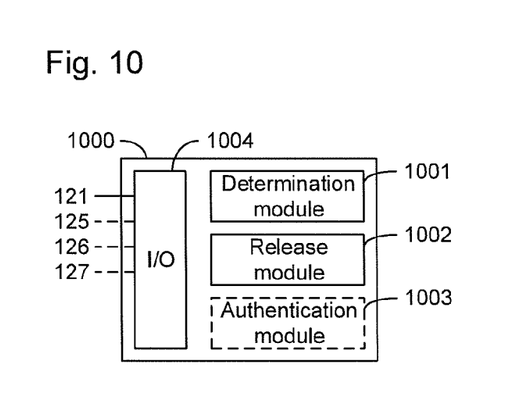
FIG. 10 shows the processing means comprised in the wireless-charging device, in accordance with another embodiment of the invention.

FIG. 10 shows an alternative embodiment 1000 of processing means 122 comprised in wireless-charging device 300. Processing means 1000 comprises a determination module 1001 for determining that a user intends to remove the wirelessly chargeable device from charging surface 120, and a release module 902 for releasing the wirelessly chargeable device from charging surface 120 in response to the determination. In addition, processing means 900 comprises one or more interfaces 904 ('I/O' in FIG. 9) for controlling and/or receiving information from holding means 121, and optionally communication unit 125, pressure sensor 126, and/or protrusible members 127. Optionally, processing means 1000 may further comprise authentication module 1003 for authenticating the user in response to detecting, by determination module 1001, that the user intends to remove the wirelessly chargeable device, wherein the wirelessly chargeable device is only released by release module 1002 if the user is successfully authenticated. Determination module 1001, release module 1003, authentication module 1003, and additional modules which processing means 1000 may comprise, are configured to perform in accordance with an embodiment of the invention as described herein.

Modules 901-904 and 1001-1004, as well as any additional modules comprised in processing means 900 or 1000, may be implemented by any kind of electronic circuitry, e.g., any one, or a combination of, analogue electronic circuitry, digital electronic circuitry, and processing means executing a suitable computer program.

Figure 11:
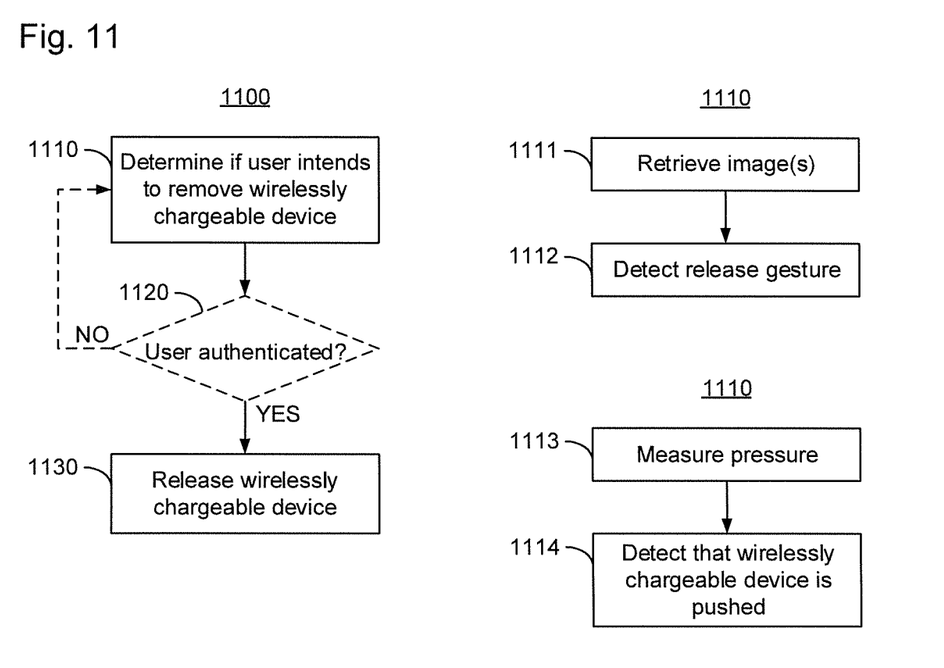
FIG. 11 shows a method of charging a wirelessly chargeable device, in accordance with embodiments of the invention.

In the following, embodiments of the method of charging a wirelessly chargeable device held by an attractive force generated between the wirelessly chargeable device and a charging surface of a wireless-charging device, so as to prevent displacement of the wirelessly chargeable device when placed on the charging surface, is described with reference to FIG. 11.

Method 1100 comprises determining 1110 that a user intends to remove wirelessly chargeable device 110/210 from charging surface 120, and releasing 1130 wirelessly chargeable device 110/210 from charging surface 120 in response thereto.

For instance, determining 1110 that the user intends to remove wirelessly chargeable device 110/210 may comprise receiving a release instruction from the user via a user-interface of wirelessly chargeable device 110/210, such as pressing a button 412 or receiving a spoken instruction 421 (as is illustrated in FIGS. 4A and 4B, respectively). Alternatively, determining 1110 that the user intends to remove wirelessly chargeable device 110/210 may comprise retrieving 1111 one or more images captured by a camera 114 having a field of view which is oriented away from charging surface 120 when wirelessly chargeable device 110/210 is placed on charging surface 120, and detecting 1112, through image processing the one or more captured images, a release gesture performed by a body part of the user. As a further alternative, determining 1110 that the user intends to remove wirelessly chargeable device 110/210 may comprise measuring 1113 a pressure applied to the wirelessly chargeable device, and detecting 1114 that wirelessly chargeable device 110/210 is pushed against charging surface 120 if the measured pressure exceeds a threshold value. As a further alternative, determining 1110 that the user intends to remove wirelessly chargeable device 110/210 may comprise detecting that wirelessly chargeable device 110/210 is gripped by a hand 410 of the user 8 as is illustrated in FIG. 4C). As a further alternative, determining 1110 that the user intends to remove wirelessly chargeable device 110/210 may comprise receiving, via a communication unit 125 for effecting wireless communications with wirelessly chargeable device 110/ 210, a release request from wirelessly chargeable device 110/210.

Furthermore, releasing 1130 wirelessly chargeable device 110/210 may comprise controlling holding means 111/121 to reduce the attractive force. Optionally, method 1100 may further comprise controlling holding means 111/121 to increase the attractive force in response to detecting that wirelessly chargeable device 110/210 is being placed on charging surface 120. As an alternative, releasing 1130 wirelessly chargeable device 110/210 may comprise controlling one or more protrusible members 117, which are provided on a face of wirelessly chargeable device 110/210 facing charging surface 120 when placed on charging surface 120, to protrude. As a further alternative, releasing 1130 wirelessly chargeable device 110/210 may comprise controlling one or more protrusible members 127, which are provided on charging surface 120, to protrude. As a further alternative, releasing 1130 wirelessly chargeable device 110/ 210 may comprise controlling a shape of wirelessly chargeable device 110/210 so as to reduce a contact area between wirelessly chargeable device 110/210 and charging surface 120. As a further alternative, releasing 1130 wirelessly chargeable device 110/210 may comprise transmitting, via a communication unit 115 for effecting wireless communications with wireless-charging device 300, a release request to wireless-charging device 300.

Optionally, method 1100 may further comprise authenticating 1120 the user in response to detecting 1110 that the user intends to remove wirelessly chargeable device 110/ 210, wherein wirelessly chargeable device 110/210 is only released 1130 if the user is successfully authenticated.

It will be appreciated that method 1100 may comprise additional, or modified, steps in accordance with what is described throughout this disclosure. Method 1100 may be performed by either one, or both, of a wirelessly chargeable device and a wireless-charging device. An embodiment of method 1100 may be implemented as software, such as computer program 703 or 803, to be executed by processing unit 701 comprised in wirelessly chargeable device 110/210, and/or processing unit 801 comprised in wireless-charging device 300, whereby wirelessly chargeable device 110/210 and/or wireless-charging device 300 is/are operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A wirelessly chargeable device, comprising:
   a holder for generating an attractive force between the wirelessly chargeable device and a charging surface of a wireless-charging device, so as to prevent displacement of the wirelessly chargeable device when placed on the charging surface; and
   a processing unit being operative to: (i) determine whether a user intends to remove the wirelessly chargeable device from the charging surface based on an input received from the user, and
   (ii) as a result of determining that the user intends to remove the wirelessly chargeable device from the charging surface, release the wirelessly chargeable device from the charging surface.

2. The wirelessly chargeable device according to claim 1, further comprising a user-interface for controlling the wirelessly chargeable device, the processing unit being operative to determine that the user intends to remove the wirelessly chargeable device by receiving a release instruction from the user via the user-interface.

3. The wirelessly chargeable device according to claim 1, further comprising a pressure sensor for measuring a pressure applied to the wirelessly chargeable device,
   and the processing unit being further operative to: (i) compare the measured pressure to a threshold value, and
   (ii) as a result of determining that the measured pressure exceeds the threshold value, determine that the user intends to remove the wirelessly chargeable device.

4. The wirelessly chargeable device according to claim 1, further comprising touch sensors for detecting a hand of the user touching the wirelessly chargeable device, the processing unit being operative to determine that the user intends to remove the wirelessly chargeable device by detecting that the wirelessly chargeable device is gripped by a hand of the user.

5. The wirelessly chargeable device according to claim 1, the processing unit being operative to release the wirelessly chargeable device by controlling the holder to reduce the attractive force.

6. The wirelessly chargeable device according to claim 5, the processing unit being further operative to control the unit holder to increase the attractive force in response to detecting that the wirelessly chargeable device is being placed on the charging surface.

7. The wirelessly chargeable device according to claim 1, further being configured to change its shape, the processing unit being operative to release the wirelessly chargeable device by controlling the shape of the wirelessly chargeable device so as to reduce a contact area between the wirelessly chargeable device and the charging surface.

8. The wirelessly chargeable device according to claim 1, further comprising a communication unit for effecting wireless communications with the wireless-charging device, the processing unit being operative to release the wirelessly chargeable device by transmitting, via the communication unit, a release request to the wireless-charging device.

9. The wirelessly chargeable device according to claim 1, wherein the holder comprises a magnetic member.

10. The wirelessly chargeable device according to claim 1, wherein the holder comprises an adhesive surface which is provided on a face of the wirelessly chargeable device facing the charging surface when placed on the charging surface.

11. The wirelessly chargeable device according to claim 1, wherein the charging surface is substantially vertical.

12. The wirelessly chargeable device according to claim 1, wherein the wirelessly chargeable device is one of a mobile phone, a mobile terminal, a smartphone, a tablet, a personal digital assistant, a wearable device, or a watch.

13. A wireless-charging device, comprising:
   a charging surface for receiving a wirelessly chargeable device;
   a holder for generating an attractive force between the wirelessly chargeable device and the charging surface, so as to prevent displacement of the wirelessly chargeable device when placed on the charging surface; and
   a processing unit being operative to: (i) determine whether a user intends to remove the wirelessly chargeable device from the charging surface based on an input received from the user; and
   (ii) as a result of determining that the user intends to remove the wirelessly chargeable device from the charging surface, release the wirelessly chargeable device from the charging surface.

14. The wireless-charging device according to claim 13, further comprising a communication unit for effecting wireless communications with the wirelessly chargeable device, the processing unit being operative to determine that the user intends to remove the wirelessly chargeable device by receiving, via the communication unit, a release request from the wirelessly chargeable device.

15. The wireless-charging device according to claim 13, further comprising a pressure sensor for measuring a pressure applied to the charging surface,
and the processing unit being further operative to: (i) compare the measured pressure to a threshold value, and
(ii) as a result of determining that the measured pressure exceeds the threshold value, determine that the user intends to remove the wirelessly chargeable device.

16. The wireless-charging device according to claim 13, the processing unit being operative to release the wirelessly chargeable device by controlling the holder to reduce the attractive force.

17. The wireless-charging device according to claim 16, the processing unit being further operative to control the holder to increase the attractive force in response to detecting that the wirelessly chargeable device is being placed on the charging surface.

18. The wireless-charging device according to claim 13, further comprising one or more protrusible members which are provided on the charging surface, the processing unit being operative to release the wirelessly chargeable device by controlling the one or more protrusible members to protrude.

19. The wireless-charging device according to claim 13, wherein the holder comprises a magnetic member.

20. The wireless-charging device according to claim 13, wherein the holder comprises an adhesive surface which is provided on the charging surface.

21. The wireless-charging device according to claim 13, wherein the charging surface is substantially vertical when the wireless-charging device is in operation.

22. The wireless-charging device according to claim 13, the wirelessly chargeable device being one of a mobile phone, a mobile terminal, a smartphone, a tablet, a personal digital assistant, a wearable device, or a watch.

23. A method of charging a wirelessly chargeable device held by an attractive force generated between the wirelessly chargeable device and a charging surface of a wireless-charging device, so as to prevent displacement of the wirelessly chargeable device when placed on the charging surface, the method comprising:
determining whether a user intends to remove the wirelessly chargeable device from the charging surface based on an input received from the user; and
as a result of determining that the user intends to remove the wirelessly chargeable device from the charging surface, releasing the wirelessly chargeable device from the charging surface.

24. The method according to claim 23, wherein the determining that the user intends to remove the wirelessly chargeable device comprises receiving a release instruction from the user via a user-interface of the wirelessly chargeable device.

25. The method according to claim 23, wherein the determining that the user intends to remove the wirelessly chargeable device comprises:

retrieving one or more images captured by a camera having a field of view which is oriented away from the charging surface when the wirelessly chargeable device is placed on the charging surface; and
detecting, through image processing the one or more captured images, a release gesture performed by a body part of the user.

26. The method according to claim 23, wherein the determining that the user intends to remove the wirelessly chargeable device comprises:
measuring a pressure applied to the wirelessly chargeable device;
comparing the measured pressure to a threshold value; and
as a result of determining that the measured pressure exceeds the threshold value, determining that the user intends to remove the wirelessly chargeable device.

27. The method according to claim 23, wherein the determining that the user intends to remove the wirelessly chargeable device comprises detecting that the wirelessly chargeable device is gripped by a hand of the user.

28. The method according to claim 23, wherein the releasing the wirelessly chargeable device comprises controlling the charging surface to reduce the attractive force.

29. The method according to claim 28, further comprising controlling the charging surface to increase the attractive force in response to detecting that the wirelessly chargeable device is being placed on the charging surface.

30. The method according to claim 23, wherein the releasing the wirelessly chargeable device comprises controlling one or more protrusible members, which are provided on a face of the wirelessly chargeable device facing the charging surface when placed on the charging surface, to protrude.

31. The method according to claim 23, wherein the releasing the wirelessly chargeable device comprises controlling one or more protrusible members, which are provided on the charging surface, to protrude.

32. The method according to claim 23, wherein the releasing the wirelessly chargeable device comprises controlling a shape of the wirelessly chargeable device so as to reduce a contact area between the wirelessly chargeable device and the charging surface.

33. The method according to claim 23, wherein the releasing the wirelessly chargeable device comprises transmitting, via a communication unit for effecting wireless communications with the wireless-charging device, a release request to the wireless-charging device.

34. The method according to claim 23, wherein the determining that the user intends to remove the wirelessly chargeable device comprises receiving, via a communication unit for effecting wireless communications with the wirelessly chargeable device, a release request from the wirelessly chargeable device.

35. The method according to claim 23, further comprising authenticating the user in response to detecting that the user intends to remove the wirelessly chargeable device, wherein the wirelessly chargeable device is only released if the user is successfully authenticated.

36. The method according to claim 23, wherein the charging surface is substantially vertical.

37. The method according to claim 23, the wirelessly chargeable device being one of a mobile phone, a mobile terminal, a smartphone, a tablet, a personal digital assistant, a wearable device, or a watch.

38. The method according to claim 23, being performed by the wirelessly chargeable device.

39. The method according to claim 23, being performed by the wireless-charging device.

40. A computer program comprising computer-executable instructions for causing a device to perform the method according to claim 23, when the computer-executable instructions are executed on a processing unit comprised in the device.

41. A computer program product comprising a non-transitory computer-readable storage medium, the computer-readable storage medium having the computer program according to claim 40 embodied therein.

42. A wirelessly chargeable device, comprising:
a holder for generating an attractive force between the wirelessly chargeable device and a charging surface of a wireless-charging device, so as to prevent displacement of the wirelessly chargeable device when placed on the charging surface;
a processing unit being operative to: (i) determine whether a user intends to remove the wirelessly chargeable device from the charging surface based on an input received from the user, and
(ii) as a result of determining that the user intends to remove the wirelessly chargeable device from the charging surface, release the wirelessly chargeable device from the charging surface; and
a camera facing in a direction opposite to the charging surface when the wirelessly chargeable device is placed on the charging surface, the processing unit being further operative to determine that the user intends to remove the wirelessly chargeable device by performing a process comprising:
retrieving one or more images captured by the camera; and
detecting, through image processing the one or more captured images, a release gesture performed by the user.

43. A wirelessly chargeable device, comprising:
a holder for generating an attractive force between the wirelessly chargeable device and a charging surface of a wireless-charging device, so as to prevent displacement of the wirelessly chargeable device when placed on the charging surface;
a processing unit being operative to: (i) determine whether a user intends to remove the wirelessly chargeable device from the charging surface based on an input received from the user, and
(ii) as a result of determining that the user intends to remove the wirelessly chargeable device from the charging surface, release the wirelessly chargeable device from the charging surface; and
one or more protrusible members which are provided on a face of the wirelessly chargeable device facing the charging surface when placed on the charging surface, the processing unit being further operative to release the wirelessly chargeable device by controlling the one or more protrusible members to protrude.

44. A wirelessly chargeable device, comprising:
a holder for generating an attractive force between the wirelessly chargeable device and a charging surface of a wireless-charging device, so as to prevent displacement of the wirelessly chargeable device when placed on the charging surface; and
a processing unit being operative to: (i) determine whether a user intends to remove the wirelessly chargeable device from the charging surface based on an input received from the user,
(ii) as a result of determining that the user intends to remove the wirelessly chargeable device from the charging surface, release the wirelessly chargeable device from the charging surface, and
(iii) authenticate the user in response to detecting that the user intends to remove the wirelessly chargeable device, wherein the wirelessly chargeable device is only released if the user is successfully authenticated.

* * * * *